Feb. 13, 1945.  F. HUMER  2,369,295

RETRACTABLE HEADLAMP

Filed March 25, 1943  5 Sheets-Sheet 1

Inventor
Frank Humer
By Blackmore, Spencer & Heit
Attorneys

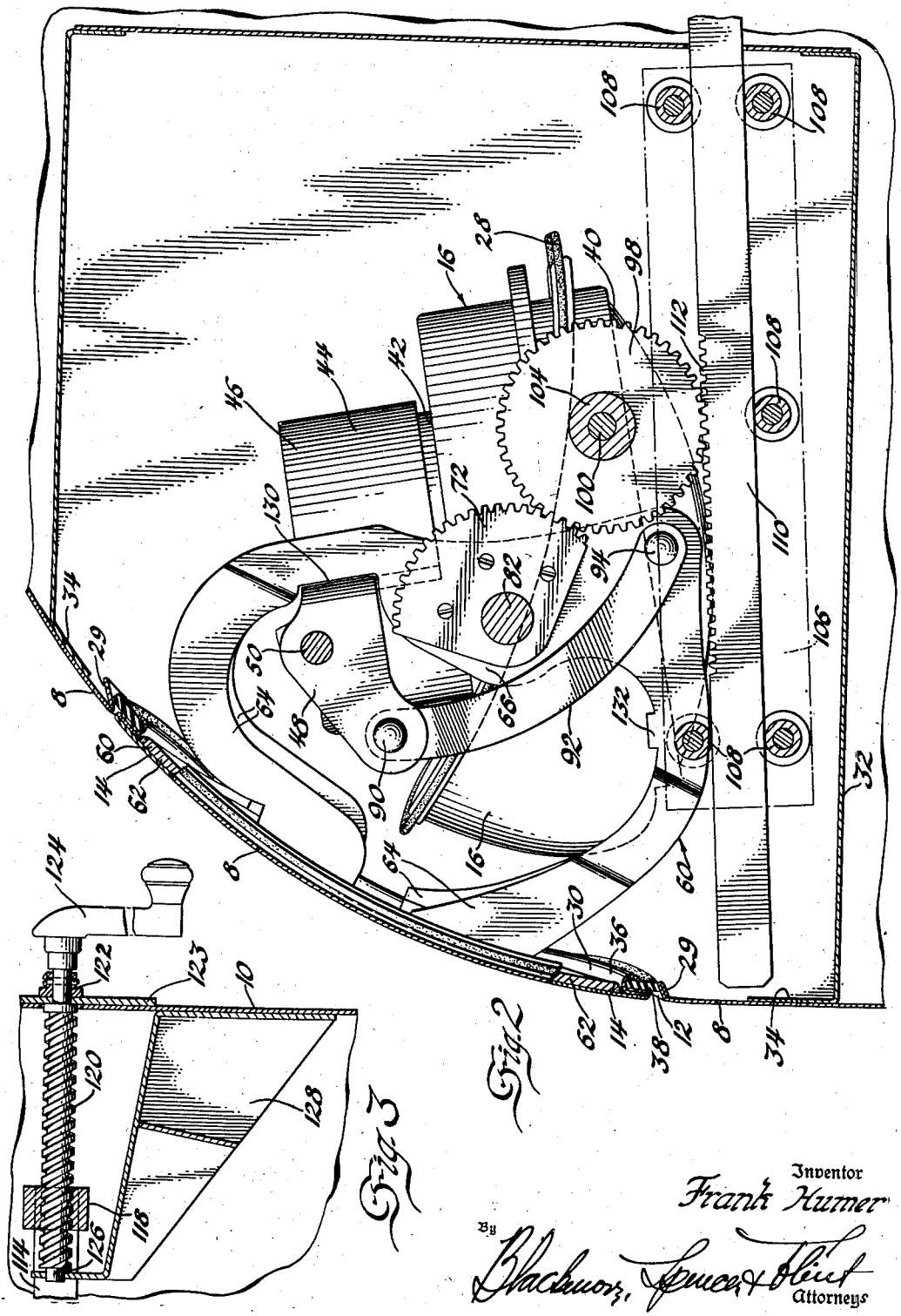

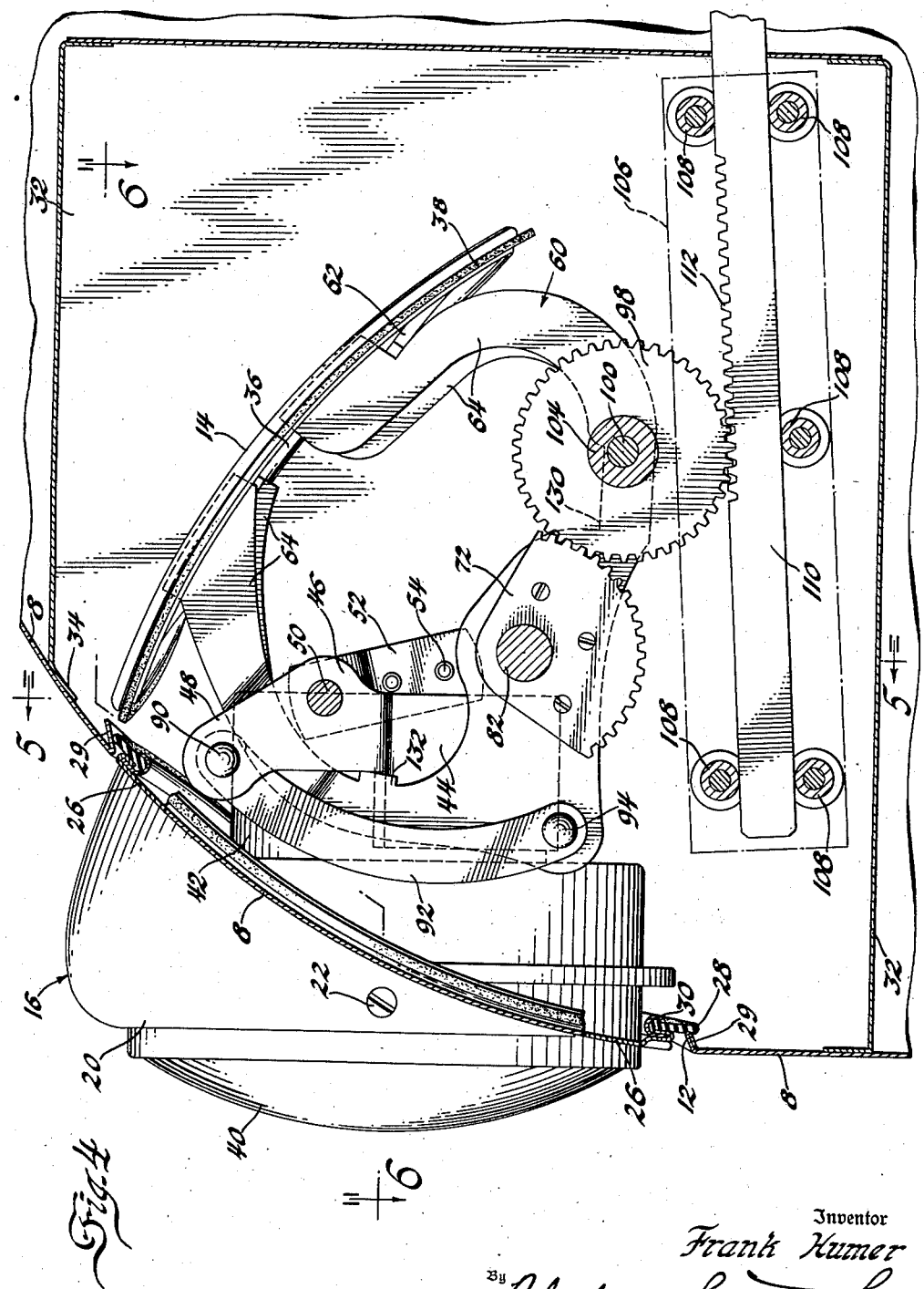

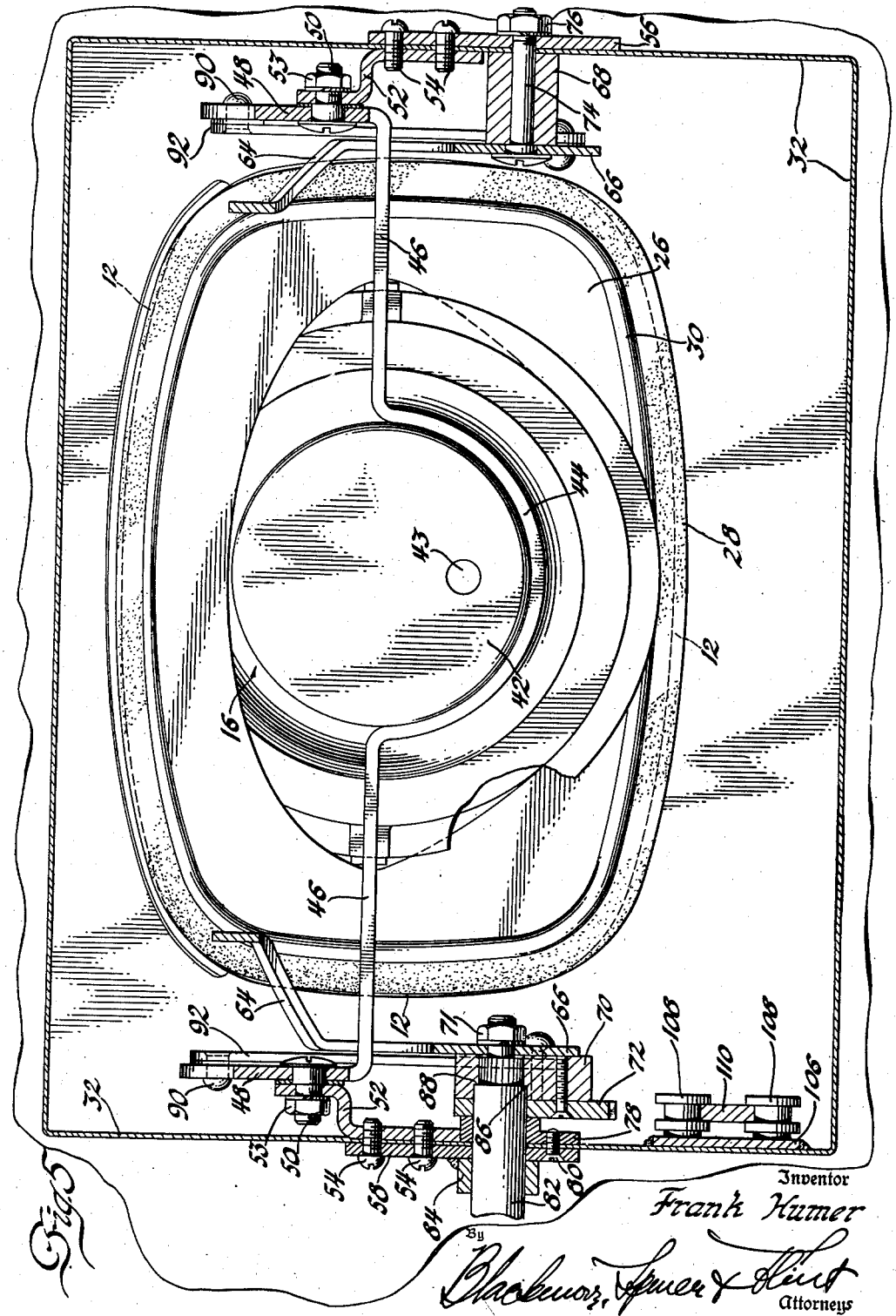

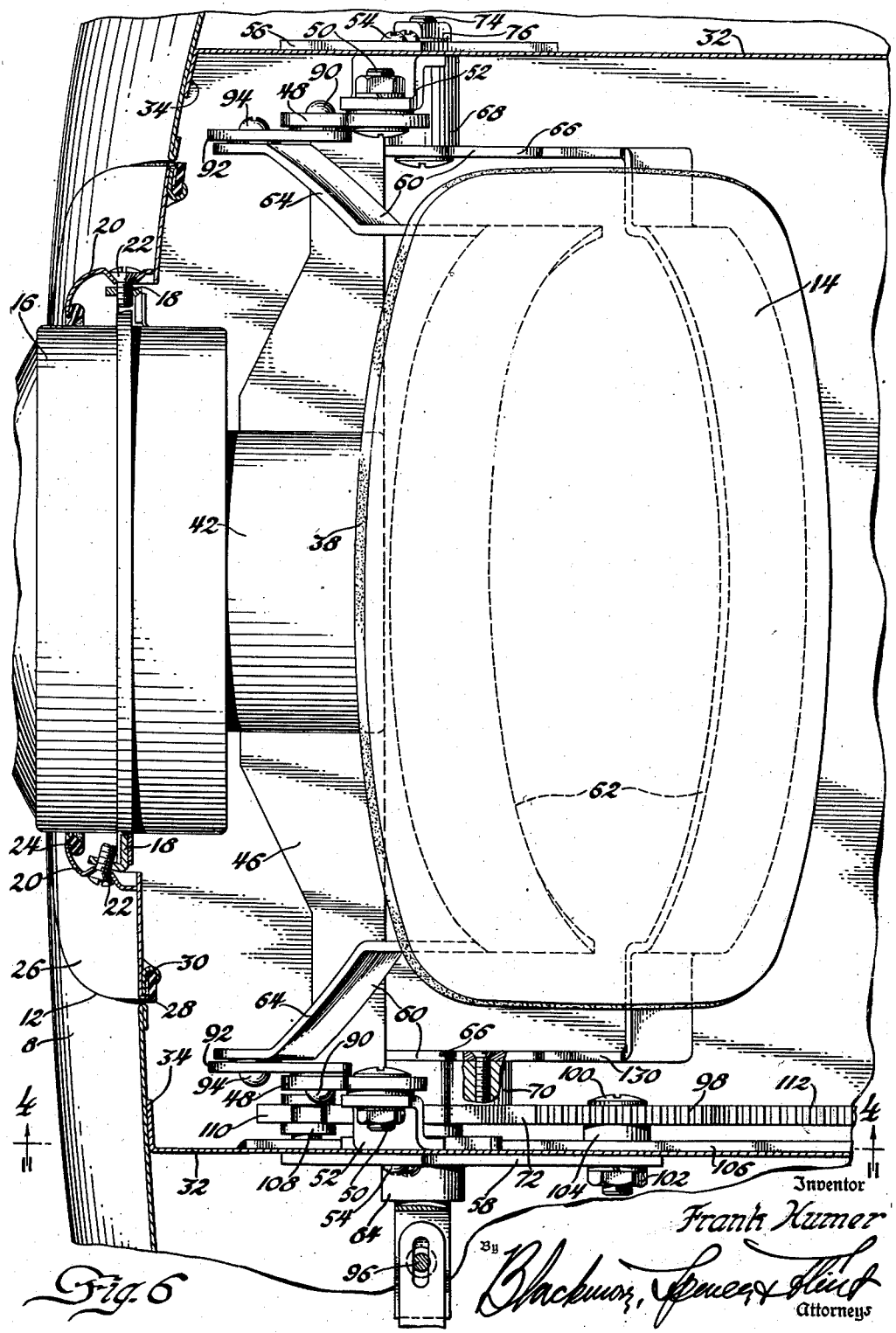

Patented Feb. 13, 1945

2,369,295

UNITED STATES PATENT OFFICE 2,369,295

RETRACTABLE HEAD LAMP

Frank Humer, Detroit, Mich., assignor to General Motors Corporation, Detroit, Mich., a corporation of Delaware Application March 25, 1943, Serial No. 480,489

12 Claims. (Cl. 240—7.1)

This invention relates to retractable headlamps as applied to automotive vehicles.

The headlamps of the invention are mounted to move into and out of openings in the front fenders of the vehicle. A cover or shutter is also applied and moves over the opening to close it, or rearwardly into the fender to expose the opening, depending upon the position of the headlamp. The lamps and covers on the two sides of the vehicle are equipped with similar mechanisms to enable them to move simultaneously and cooperatively to and away from the openings, and these mechanisms at the opposite sides of the vehicle are interconnected to cause them to move in unison. A gear and segment applied to one mechanism is operated by a rack which in turn is manually operated from the dash, and the operation of the rack will cause both mechanisms to function to cause the lamps to move into the openings and the shutters or covers away from the openings.

In the cooperative movement of the cover and lamp, both are caused simultaneously to turn on fixed axes either clockwise to cause the lamps to move into the openings and the covers away from the openings, or to turn counterclockwise to move the lamps out of the openings and the covers over the openings.

A sealing means is provided between the lamp and the opening and between the cover and the opening to form a weathertight connection when the lamp or the cover is in the opening.

Other novel parts of the invention relate to specific details of construction of the mechanisms to cause the cover and lamp to move.

On the drawings

Figure 2 is an enlarged sectional view on the line 2—2 of Figure 1, showing the cover or shutter in position over the fender opening and the headlamp in retracted position under the fender.

Figure 3 is an enlarged sectional view on the line 3—3 of Figure 1, illustrating the manually operable mechanism to cause the operation of the covers and headlamps.

Figure 4 is an enlarged sectional view similar to Figure 2, but showing the cover in retracted position under the fender and the headlamp in its operative position in the fender opening.

Figures 5 and 6 are sectional views taken on the lines 5—5 and 6—6 of Figure 4.

Figure 1:
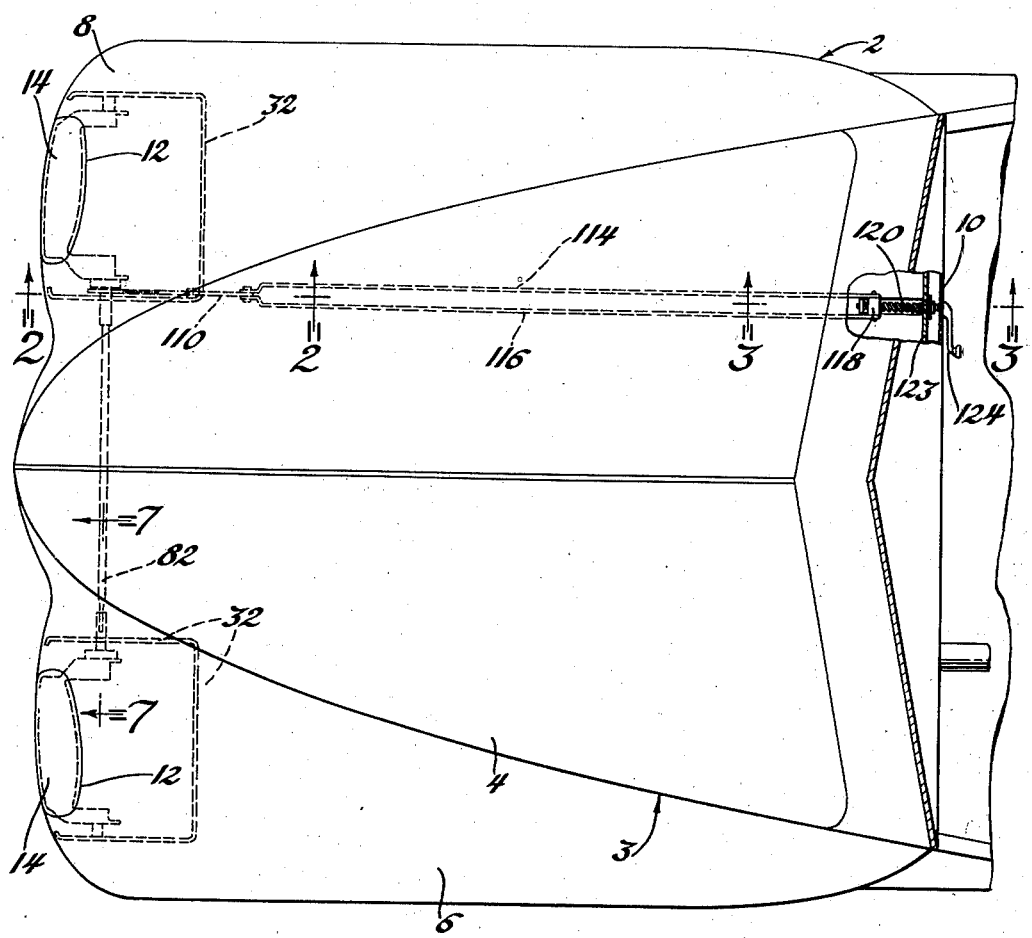
Figure 1 is a plan view of the front part of an automotive vehicle showing the invention applied.
Figure 7:
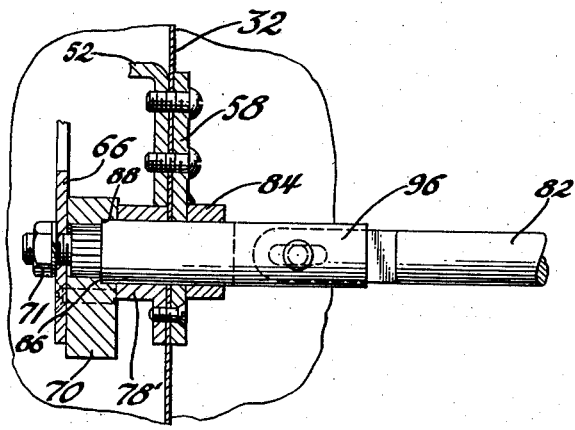

Figure 7 is an enlarged sectional detailed view on the line 7—7 of Figure 1.

Referring to the drawings, 2 indicates an automotive vehicle provided with the usual hood 3 having a removable or hinged door 4, front fenders 6 and 8, and instrument panel 10. The fenders 6 and 8 are provided with openings 12 at their fore parts. These openings can be covered by the covers or shutters 14 which conform to the general contour of the fender, or there may be received in the openings the headlamps 16.

The structure and mechanism attached to the headlamps and covers at the two sides of the vehicle is the same and the description of one will suffice for both.

Referring to Figure 6, the headlamp has secured thereto the angle irons 18 which are provided with threaded openings. A trim or finishing member or housing 20 surrounds the lamp and is secured to the angle irons by the screws 22 threaded into the openings in the irons 18. A rubber or fabric ring 24 is secured to the member 20 and makes a tight waterproof joint between the lamp 16 and the member. The member 20 is secured to a frame 26 as by welding and this frame has a peripheral shape to enable it to fit in the opening 12 and an outer surface to enable it to conform to the exterior shape of the fender 6 or 8. A rubber or fabric sealing ring or washer 28 is mounted in a frame 30 which is secured to the edge of the frame 26. When the lamp 16 is in the opening 12, the sealing ring 28 is pressed against the inclined flange 29 at the edge of the opening 12 to make a waterproof seal or joint as is shown in Figure 4.

Under each fender 6 or 8, immediately behind the openings 12, a housing or box 32 is constructed and this box is secured to the fender by the edge flanges 34. Inside this box there is mounted the mechanism for moving or operating the cover 14 and the lamp 16.

The cover 14 is shaped to fit in the opening 12 and the edge of the cover is flanged inwardly over the edge of a retainer ring 36 which holds a rubber or fabric sealing member or washer 38. When the cover 14 is in the opening, the rubber or fabric ring 38 forms a waterproof seal with flange 29 at the edge of the opening 12, as shown in Figure 2.

The headlamp 16 is provided with a lens 40 at its front and has a cylindrical extension 42 at its back part. This part 42 has an opening 43 for the lead wires to the bulb of the headlamp. To this cylindrical extension there is rigidly secured the semicylindrical recessed part 44 of a metal headlamp support 46. This support is generally U-shaped with the recess 44 at the middle of the base of the U. The arms 48 of the support extend in an upward direction when the lamp is in operative position as shown in Figures 4 and 6. Each arm 48 is provided with an opening to receive bolts 50 which act as journals for the arms 48 to enable the support 46 and its attached headlamp to turn to swing into and away from the opening 12. The bolts are mounted in or supported by angle irons 52, secured by screws 54 to the sides of the box 32. The bolts 50 are held in place by nuts 53. A reinforcing and strengthening plate 56 is applied at one side of the box and a reinforcing plate 58 at the other side. The screws 54 pass through both plates 56 and 58.

The cover 14 is rigidly secured to a bracket 60 formed of a single piece of metal and suitably bent to the desired shape. The bracket 60 has two transverse parts 62 which are directly secured to the back of the cover; two legs 64 at each side and bent at substantially right angles to the transverse parts 62; and two connecting arms 66, one arm at each side joining the legs 64. Each arm 66 has rigidly secured thereto a spacer 68 or 70 and the spacer 70 has rigidly secured thereto a gear segment 72. A bolt 74 passes through an opening in the arm 66 and through a bore in the spacer 68 and is secured to the side 32 of the box by means of a nut 76 (see Figure 5). This bolt 74 forms a journal for the arm 66 at one side of the box. At the opposite side of the box a spacer 78 is secured to the side wall 32 by means of screws 80. The end of a shaft 82 passes through bores in a bearing 84, welded to the plate 58, through the plate 58, the side of the box 32, the spacer 78, the segment 72, the spacer 70, and through an opening in the arm 66. The shaft end has a shoulder 86 which abuts against a mating shoulder 88 in the spacer 70 and a nut 71 screwed on the end of the shaft rigidly unites the shaft to the segment 72 and arm 66. The bore in the parts 84, 58, 32 and 78 forms a bearing for the shaft end. The shaft 82 and the bolt 74 are on a common axis.

As is best seen in Figure 5, the legs 48 of the support 46 extend beyond and between the lateral legs 64 of the bracket 60. The end of each leg 48 is provided with an opening to receive a stud 90 which forms a pivot for one end of a link 92, the other end of which is pivoted at 94 to the arms 66 operatively and functionally to unite the mechanism which operates the cover with the mechanism which operates the headlamp. There are two links 92, one at each leg 48.

The shaft 82 extends across the vehicle through the hood and at the opposite side of the vehicle is connected to the cover mechanism on that side of the vehicle as shown in Figure 7. In this figure there is no gear segment 72 because none is needed and the spacer 78' is sufficiently wider to compensate for the thickness of the segment. The shaft preferably has a slip joint 96 at each end to accommodate the shaft to small inaccuracies in spacing or widths of vehicles and of vehicle fenders.

At the side of the vehicle where the lamp and cover mechanisms are equipped with the gear segment 72, a gear wheel 98 is turnably mounted on a shaft or bolt 100 mounted in the plate 58 and the side of the box 32. A nut 102 holds the bolt 100 in place and a spacer 104 is positioned between the gear 98 and the wall of the box 32. The gear wheel 98 is always in mesh with the gear sector 72.

A plate 106 is mounted on the wall of the box 32 and five grooved rollers 108 are rotatably mounted on the plate. Four of these rollers are mounted in pairs as is shown in Figure 4, and the fifth roller is positioned between the two pairs and substantially under the axis of rotation of the gear wheel 98. Between the pairs of rollers and on the fifth roller there is slidably mounted a bar 110 having a rack 112 on its upper surface. This rack 112 is constantly in mesh with the gear wheel 98.

The end of the bar 110 extends rearwardly out of the box 32 and has rigidly connected thereto the ends of two metal push-and-pull bars 114 and 116. The bars 114 and 116 extend to the instrument board and at the rear of the board are connected to a block 118, internally threaded and mounted on a worm shaft 120, the end 122 of which is turnably mounted in a bracket 123 secured to the instrument board 10. An operating handle 124 is rigidly secured to the end 122 of the worm shaft 120. The other end 126 of the worm is turnably mounted in a bracket 128 secured to the bracket 123 and to the instrument panel 10.

Referring to Figure 2, it is to be noted that the cover or shutter 14 is in the position it occupies when the opening 12 is completely covered, and the headlamp is in its retracted position within the box 32 under the fender. In this position of the parts the legs 64 at the top of the figure abut against the headlamp support 46 to limit the movement of the parts of the mechanisms. The upper arms 64 are provided with recesses 130 to receive the support 46. The headlamp 16 moves between the legs 64 of the bracket 60 in its movement to and from the opening 12, but inasmuch as the arms 48 of the headlamp support are outside the legs 64, the recesses 130 of the legs can strike against the headlamp support 46.

To cause the operation of the mechanisms from the position of Figure 2 to that of Figure 4, the operator will turn the handle 124 to cause the rack 112 to be moved to the right (Figure 2). The gear segment 72 will be moved through the intermediary of the gear 98. The segment 72 is rigid with the bracket 60 and the bracket will now move on the axis of parts 74 and 82 from the Figure 2 position to that of Figure 4. In this movement the weather seal at 29 and 38 will be broken and the cover 14 will be moved on an arc upwardly and rearwardly until it is inside the box and in the position of the parts shown in Figure 4.

The cover mechanism is connected to the lamp mechanism by the links 92 and during the movement of the cover described in the preceding paragraph, the links 92 will push on the arms 48 of the lamp mechanism to move the arms and the lamp support 46 on the common axis of the bolts 50 from the position of Figure 2 to that of Figure 4. This movement of the support will cause the lamp 16 to swing upwardly and forwardly or outwardly on an arc with the axis of the bolts 50 as a center. The lamp will move upwardly and forwardly or outwardly (Figure 2) between the arms 64 of the bracket 60 until it reaches the position illustrated in Figure 4. In the final position (Figure 4) the rubber ring 28 will be pressed against flange 29 at the edge of the opening 12 to form a weathertight seal and lugs 132 on the lower legs 64 (Figure 2) will strike against the support 46 to limit the movement of the mechanisms.

The operation of the parts just described for the lamp and cover at the gear segment side of the vehicle will be duplicated by the lamp and cover at the other side, the movement or operation being transmitted across the vehicle by the shaft 82.

To cause the movement of the parts from the position shown in Figure 4 to that shown in Figure 2, the hand crank 124 is turned in a direction to cause the rack 112 to be moved to the left (Figure 4). This will cause the headlamps 16 to move out of the openings 12 and under the fenders and also cause the covers 14 to move over the openings to close them.

Instead of the hand crank 124, it is within the purview of the invention to use a source of power, such as an electric motor or a flexible shaft operated by the engine of the vehicle, to operate the bars 114, 116 and the bar 110.

I claim:

1. In a retractable headlamp for an automotive vehicle having front fenders provided with openings to receive the headlamps, a movable cover adapted to be positioned over each opening when the lamps are in retracted position, brackets pivotally mounted in the fender at the rear of the openings, said covers secured to said brackets, a gear segment secured to one of the brackets on the axis of movement thereof, headlamps in the fenders, one headlamp at the rear of each fender opening and adapted to be moved into and away from the openings, a headlamp support secured to each lamp, said supports being journally mounted in the fender, means to interconnect the brackets and the headlamp supports to cause the covers and the lamps to move in unison, means to interconnect the brackets on opposite sides of the vehicle to cause the covers and the lamps on opposite vehicle sides to move together and in unison, and means mounted in the fender and connected to the gear segment to operate the same to move the brackets to cause the covers and the lamps to move in unison, said lamps being in retracted position when the fender openings are closed by the covers and said covers being in retracted position when the lamps are in the openings.

2. In a retractable headlamp for an automotive vehicle having front fenders provided with openings to receive the headlamps, a movable cover adapted to be positioned over each opening when the lamps are in retracted position, brackets pivotally mounted in the fender at the rear of the openings, said covers secured to said brackets, a gear segment secured to one of the brackets on the axis of movement thereof, a gear journally mounted in the fender and meshing with the segment, headlamps in the fenders, one headlamp at the rear of each fender opening and adapted to be moved into and away from the openings, a headlamp support secured to each lamp, said supports being journally mounted in the fender, means to interconnect the brackets and the headlamp supports to cause the covers and the lamps to move in unison, means to interconnect the brackets on opposite sides of the vehicle to cause the covers and the lamps on opposite vehicle sides to move together and in unison, and a rack mounted in the fender and meshing with the gear to operate the same to move the brackets to cause the covers and the lamps to move in unison, said lamps being in retracted position when the fender openings are closed by the covers and said covers being in retracted position when the lamps are in the openings.

3. In a retractable headlamp for an automotive vehicle having front fenders provided with openings to receive the headlamps, a movable cover adapted to be positioned over each opening when the lamps are in retracted position, brackets having legs pivotally mounted in the fender at the rear of the openings, said covers secured to said brackets, headlamps in the fenders, one headlamp at the rear of each fender opening and adapted to be moved between the legs of said brackets into and away from the openings, a headlamp support secured to each lamp, said supports being positioned between the brackets and being journally mounted in the fender, means to interconnect the brackets and the headlamp supports to cause the covers and the lamps to move in unison, said lamps being in retracted position under the fender when the fender openings are closed by the covers and said covers being in retracted position under the fender when the lamps are in the openings.

4. In a retractable headlamp for an automotive vehicle having front fenders provided with openings to receive the headlamps, a movable cover adapted to be positioned over each opening when the lamps are in retracted position, brackets pivotally mounted in the fender at the rear of the openings, said covers secured to said brackets, headlamps in the fenders at the rear of each fender opening and adapted to be moved into and away from the openings, a headlamp support secured to each lamp, said supports being journally mounted in the fender, means to interconnect the brackets and the headlamp supports to cause the covers and the lamps to move in unison, means on the brackets to strike against said supports to prevent further movement of the mechanism when the covers are in position to close the openings, said lamps being in retracted position when the fender openings are closed by the covers and said covers being in retracted position when the lamps are in the openings.

5. In a retractable headlamp for an automotive vehicle having front fenders provided with openings to receive the headlamps, a movable cover adapted to be positioned over each opening when the lamps are in retracted position, brackets pivotally mounted in the fender at the rear of the openings, said covers secured to said brackets, headlamps in the fenders at the rear of each fender opening and adapted to be moved into and away from the openings, a headlamp support secured to each lamp, said supports being journally mounted in the fender, means to interconnect the brackets and the headlamp supports to cause the covers and the lamps to move in unison, means on the brackets to strike against said supports to prevent further movement of the mechanism when the lamps are in position in the openings, said lamps being in retracted position when the fender openings are closed by the covers and said covers being in retracted position when the lamps are in the openings.

6. In retractable headlamps for an automotive vehicle having a fender at each side of the vehicle, each fender having an opening for a headlamp, a box built into each fender under the same, pivot members secured in each box, a headlamp support pivoted in each box on the pivot members, said headlamps being secured to said supports and movable therewith, a shaft journaled in said boxes and extending across the vehicle from one box to the other, brackets secured to the shaft in each box and movable with the shaft, a cover in each box secured to the brackets and movable therewith to cover the opening or uncover the same, a link interconnecting each support for a headlamp with the adjacent bracket to cause the brackets and supports to move simultaneously and in unison, said simultaneous movement causing the covers on both sides of the vehicle to move away from the fender openings and the corresponding lamps to move into the openings or vice versa, and manual means to operate the shaft to cause the movement of the brackets and supports.

7. In retractable headlamps for an automotive vehicle having a fender at each side of the vehicle, each fender having an opening for a headlamp, a box built into each fender under the same, a pivot member secured to each side of each box, a headlamp support pivoted in each box on the pivot members and extending across the box, said headlamps being secured to said supports and movable therewith into or away from the openings, a shaft journaled in the sides of said boxes and extending across the vehicle from one box to the other, brackets secured to the shaft in each box and movable with the shaft, a cover in each box secured to the brackets and movable therewith to cover the opening or uncover the same, a link interconnecting each support for a headlamp with the adjacent bracket to cause the brackets and supports to move simultaneously and in unison, said simultaneous movement causing the cover on one side of the vehicle to move inwardly and upwardly away from the fender opening and the corresponding lamp to move upwardly and outwardly into the opening or vice versa, and manual means to cause the movement of the brackets and supports.

8. In a retractable headlamp for an automotive vehicle having front fenders provided with openings to receive the headlamps, a movable cover adapted to be positioned over each opening when the lamps are in retracted position, brackets pivotally mounted in the fender at the rear of the openings, said covers secured to said brackets, headlamps in the fenders, one headlamp at the rear of each fender opening and adapted to be moved into and away from the openings, a headlamp support secured to each lamp, said supports being journally mounted in the fender on an axis parallel to the pivotal axis of the brackets, a link positively to interconnect the brackets and the headlamp supports to cause the covers and the lamps to move in unison, said lamps moving toward said openings simultaneously with the movement of said covers from said openings or vice versa, said lamps being in retracted position when the fender openings are closed by the covers, and said covers being in retracted position when the lamps are in the openings.

9. In a retractable headlamp for an automotive vehicle having front fenders provided with openings to receive the headlamps, a movable cover adapted to be positioned over each opening when the lamps are in retracted position, brackets having spaced legs pivotally mounted in the fender at the rear of the openings, said covers secured to said brackets, a gear segment secured to one of the brackets on the axis of movement thereof, headlamps in the fenders, one headlamp at the rear of each fender opening and adapted to be moved into and away from the openings, a headlamp support secured to each lamp, legs on said supports journally mounted in the fender, means to interconnect the legs of the brackets and the legs of the headlamp supports to cause the covers and the lamps to move in unison, said lamps moving toward said openings simultaneously with the movement of said covers from said openings or vice versa, means to interconnect the brackets on opposite sides of the vehicle to cause the covers and the lamps on opposite vehicle sides to move together and in unison, and means mounted in the fender and connected to the gear segment to operate the same to move the brackets to cause the covers and the lamps to move in unison, said lamps being in retracted position when the fender openings are closed by the covers and said covers being in retracted position when the lamps are in the openings.

10. In a retractable headlamp for an automotive vehicle having front fenders provided with openings to receive the headlamps, a movable cover adapted to be positioned over each opening when the lamps are in retracted position, brackets having legs pivotally mounted in the fender at the rear of the openings, said covers secured to said brackets, a gear segment secured to one of the legs of the brackets on the axis of movement thereof, a gear journally mounted in the fender and meshing with the segment, headlamps in the fenders, one headlamp at the rear of each fender opening and adapted to be moved into and away from the openings, a headlamp support secured to each lamp, legs on said supports journally mounted in the fender, means to interconnect the legs of the brackets and the legs of the headlamp supports to cause the covers and the lamps to move in unison, means to interconnect the brackets on opposite sides of the vehicle to cause the covers and the lamps on opposite vehicle sides to move together and in unison, and a rack mounted in the fender and meshing with the gear to operate the same to move the brackets to cause the covers and the lamps to move in unison, said lamps being in retracted position when the fender openings are closed by the covers and said covers being in retracted position when the lamps are in the openings.

11. In a retractable headlamp for an automotive vehicle having front fenders provided with openings to receive the headlamps, a movable cover adapted to be positioned over each opening when the lamps are in retracted position, brackets having legs pivotally mounted in the fender at the rear of the openings, said covers secured to said brackets, headlamps in the fenders at the rear of each fender opening and adapted to be moved into and away from the openings, a headlamp support secured to each lamp, said supports being journally mounted in the fender, means to interconnect the brackets and the headlamp supports to cause the covers and the lamps to move in unison, the legs of said brackets being in the path of the supports to enable said brackets to strike against said supports to prevent further movement of the mechanism when the covers are in position to close the openings, means to interconnect the brackets on opposite sides of the vehicle to cause the covers and the lamps on opposite vehicle sides to move together and in unison, and means mounted in the fender and connected to the brackets to operate the same to cause the covers and the lamps to move in unison, said lamps being in retracted position when the fender openings are closed by the covers and said covers being in retracted position when the lamps are in the openings.

12. In a retractable headlamp for an automotive vehicle having front fenders provided with openings to receive the headlamps, a movable cover adapted to be positioned over each opening when the lamps are in retracted position, brackets having legs pivotally mounted in the fender at the rear of the openings, said covers secured to said brackets, headlamps in the fenders at the rear of each fender opening and adapted to be moved into and away from the openings, a headlamp support secured to each lamp, legs on said supports journally mounted in the fender, means to interconnect the brackets and the headlamp supports to cause the covers and the lamps to move in unison, the legs of said supports extending outside the legs of said brackets to cause the legs of said supports and of said brackets to strike against each other to prevent further movement of the mechanism when the lamps are in position in the openings, means to interconnect the brackets on opposite sides of the vehicle to cause the covers and the lamps on opposite vehicle sides to move together and in unison, and means mounted in the fender and connected to the brackets to operate the same to cause the covers and the lamps to move in unison, said lamps being in retracted position when the fender openings are closed by the covers and said covers being in retracted position when the lamps are in the openings.

FRANK HUMER.